No. 840,281. PATENTED JAN. 1, 1907.
W. ABEL.
AUTOMATIC SELLING MACHINE.
APPLICATION FILED MAY 16, 1904.
5 SHEETS—SHEET 1.
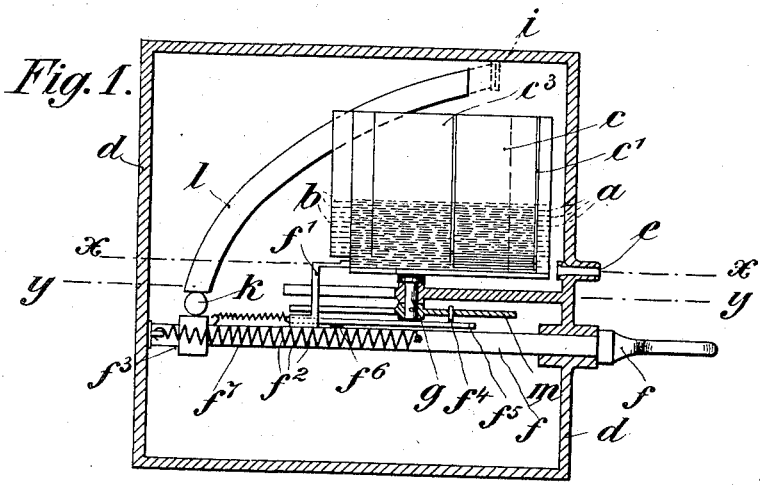
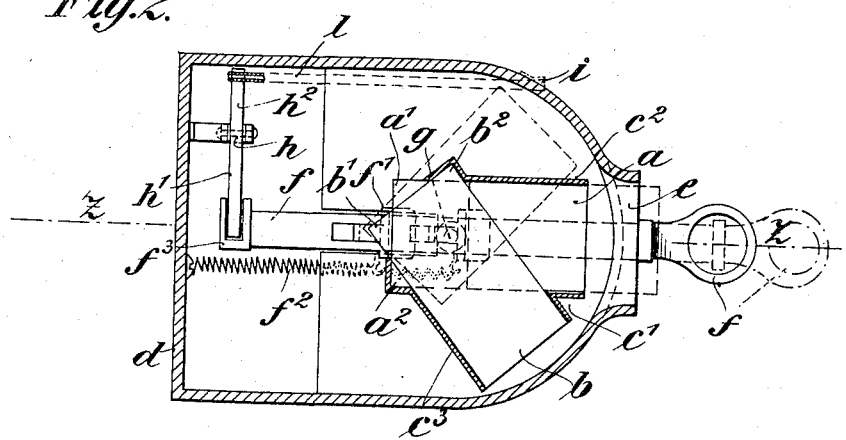
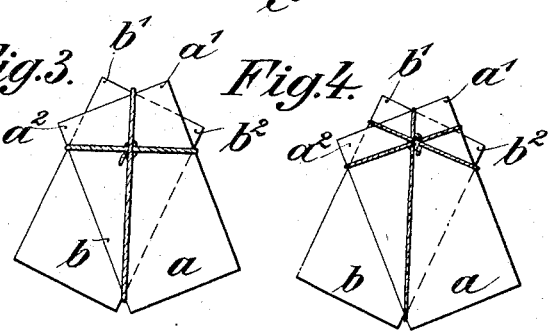
WITNESSES:
W. M. Avery
C. E. Holske
INVENTOR
Willy Abel
BY
ATTORNEYS No. 840,281. PATENTED JAN. 1, 1907.
W. ABEL.
AUTOMATIC SELLING MACHINE.
APPLICATION FILED MAY 16, 1904.
5 SHEETS—SHEET 2.
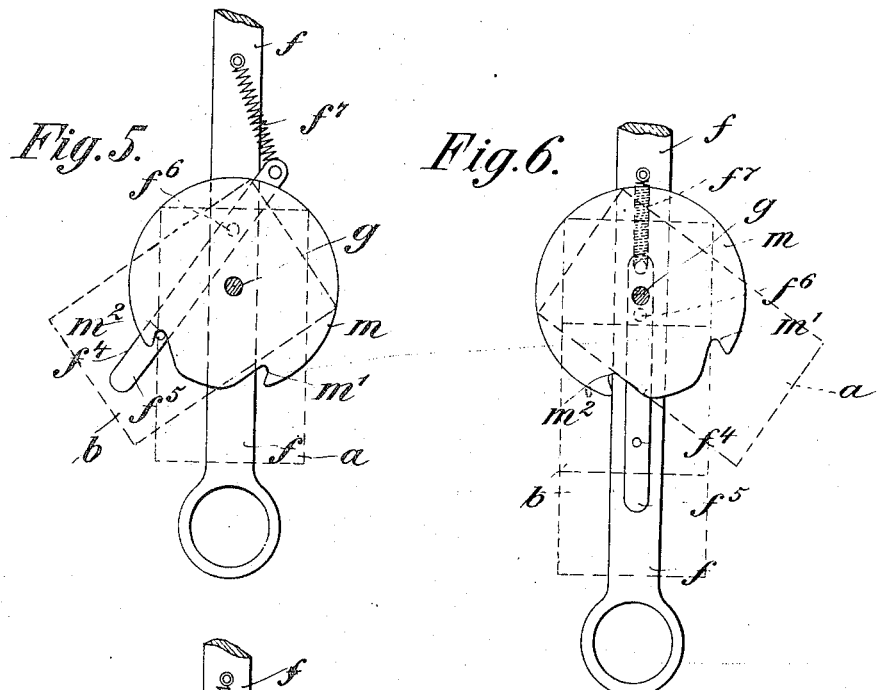
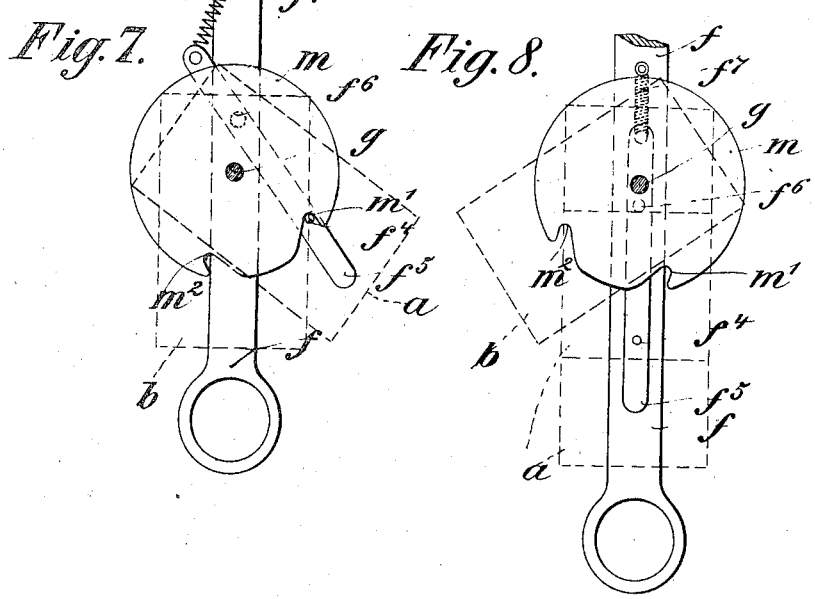
WITNESSES:
W. M. Avery
A. C. Davis
INVENTOR
Willy Abel
BY
Munn
ATTORNEYS.

No. 840,281. PATENTED JAN. 1, 1907.
W. ABEL.
AUTOMATIC SELLING MACHINE.
APPLICATION FILED MAY 16, 1904.
5 SHEETS—SHEET 3.
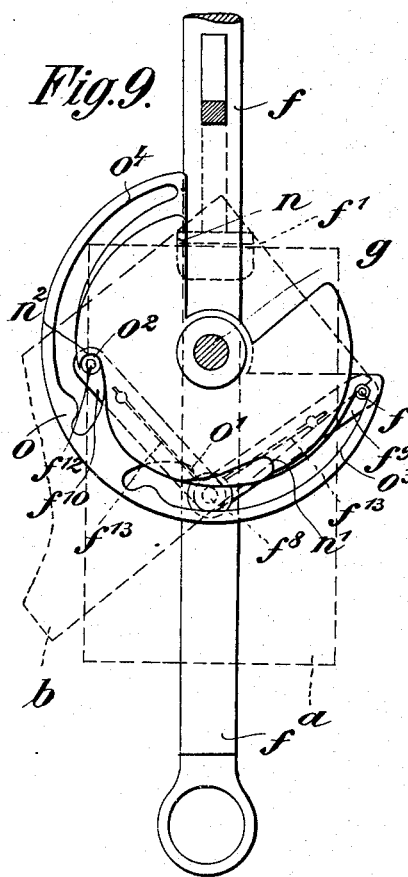
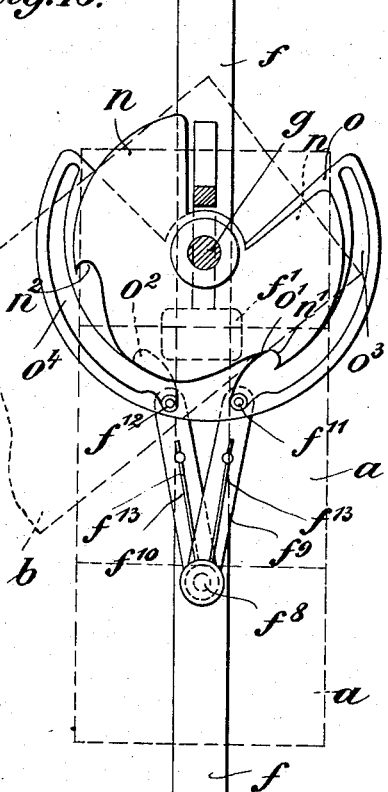
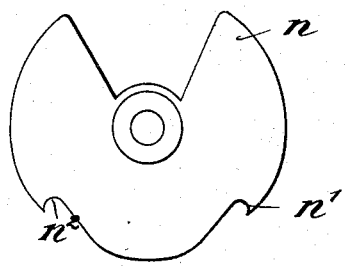
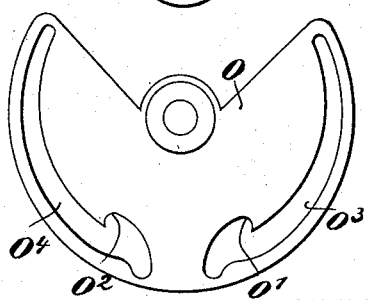
WITNESSES:
W. M. Avery
C. E. Holske
INVENTOR
Willy Abel
BY
Munn
ATTORNEYS.

No. 840,281. PATENTED JAN. 1, 1907.
W. ABEL.
AUTOMATIC SELLING MACHINE.
APPLICATION FILED MAY 16, 1904.
5 SHEETS—SHEET 4.
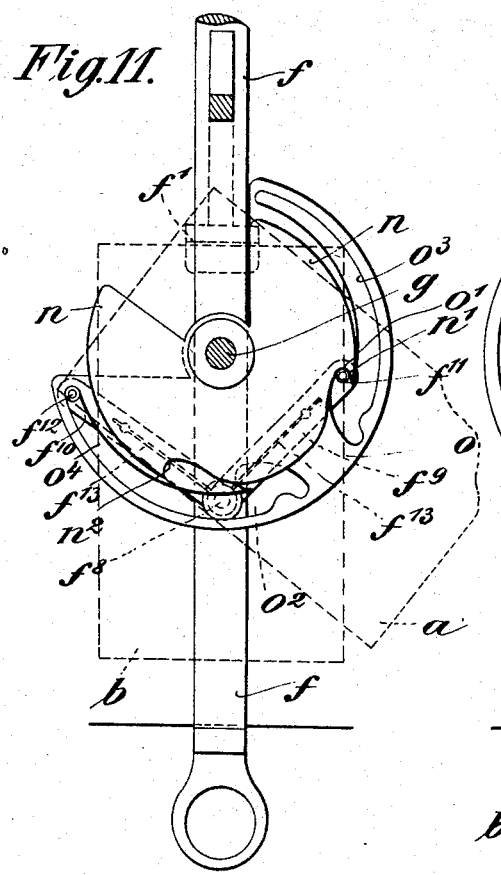
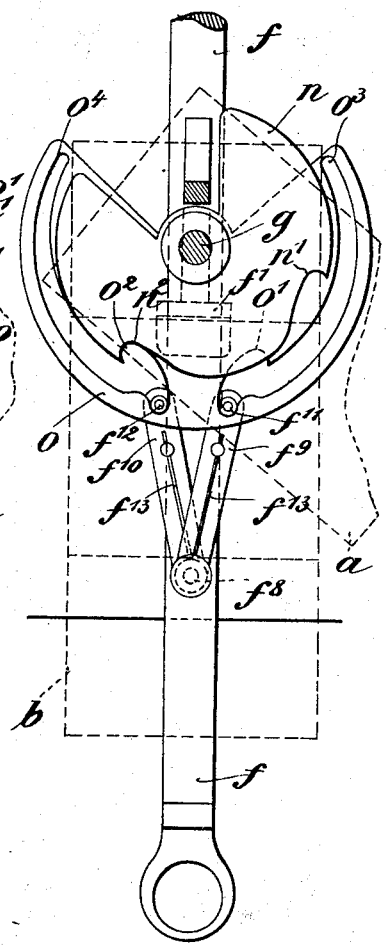
WITNESSES:
W. M. Avery
C. E. Holske
INVENTOR
Willy Abel
BY
[signature]
ATTORNEYS.

No. 840,281. PATENTED JAN. 1, 1907.
W. ABEL.
AUTOMATIC SELLING MACHINE.
APPLICATION FILED MAY 16, 1904.
5 SHEETS—SHEET 5.
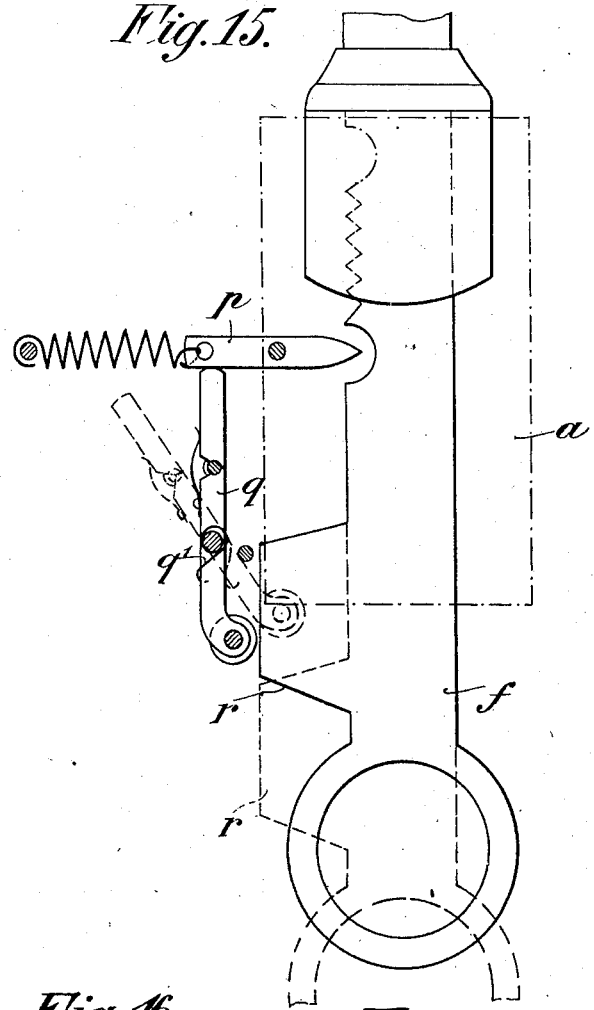
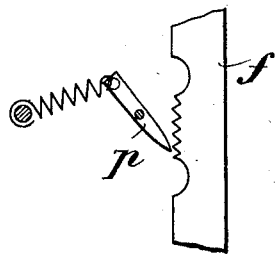
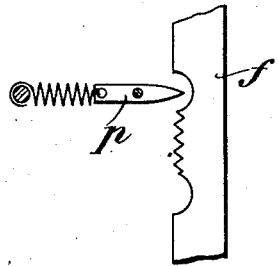
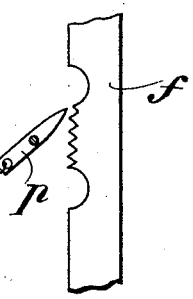
WITNESSES:
W. M. Avery
A. H. Davis
INVENTOR
Willy Abel
BY
ATTORNEYS.

UNITED STATES PATENT OFFICE.

WILLY ABEL, OF BERLIN, GERMANY, ASSIGNOR TO HEINRICH WOLLHEIM AND ARTHUR SCHUNACK, OF BERLIN, GERMANY.

AUTOMATIC SELLING-MACHINE.

No. 840,281.   Specification of Letters Patent.   Patented Jan. 1, 1907.

Application filed May 16, 1904. Serial No. 208,313.

*To all whom it may concern:*

Be it known that I, WILLY ABEL, engineer, a subject of the German Emperor, residing at 9 Lutherstrasse, Berlin, in the Empire of Germany, have invented certain new and useful Improvements in Automatic Selling-Machines for Cards, Post-Cards, and other Flat Objects, of which the following is a specification.

The present invention refers to automatic selling-machines for cards, post-cards, and such like objects in which the cards or the layers of the cards, respectively, are piled crosswise one above the other and lie in a card-holder, the two groups of cards are alternately moved before the delivery-aperture, and the last card is shoved off by the delivery-slide.

By means of the new device in the most simple way complete security is obtained against the taking out of more cards than one or when layers of two or three cards each are placed crosswise one upon the other against the taking out of more than two or three cards, respectively. At the same time it is effected that the pile of the cards is not supported only in the margins of the cards, but rests on the whole surface of the latter, and that the card to be pushed out rests flatly between the remaining pile of cards and a flat supporting-plate and can be shoved out, moving in its own plane.

Figure 1 is a side view of the apparatus cut according to line $z\ z$ of Fig. 2. Fig. 2 is a plan as per section $x\ x$ of Fig. 1. Figs. 3 and 4 are plans of the pile of cards as placed in the machine. Figs. 5 to 8 are plans of the reversing mechanism in different positions, as per section $y\ y$ of Fig. 1. Figs. 9–12 show a differing disposition of the reversing mechanism. In Figs. 13 and 14 the two eccentrics of the device shown in Figs. 9–12 are shown separately. Figs. 15–18 show a special locking device.

Oblong rectangular cards are taken—that is, such as have two short and two long sides. The cards are divided in two groups $a$ and $b$, piled up crosswise in a cardboard holder $c$. In the form of execution given as an example they lie at an angle of about sixty degrees one to the other. With their short front sides the cards are spread apart, so that there remains between them a space in the form of an acute angle, which is taken up by the lining $c'$ of the card-holder $c$. The short back sides are placed in such a manner upon one another that the one back corner $a'$ projects beyond the middle of the short back sides $b'\ b^2$ and the other back corner $b'$ projects beyond the middle of the back small sides $a^2\ a'$. The two outward corners $a^2\ b^2$, as well as the two outward longer edges of the cards $a$ and $b$, are guided between the linings $c^2$ and $c^3$ of the card-holder $c$.

The card-holder $c$ rests in the protection-case $d$, which possesses the aperture $e$ for the delivery of the cards and carries the delivery-slide $f$. The card-holder $c$ is fixed to the shaft $g$, which rests and turns in the case $d$.

The delivery-slide $f$ has to serve two functions. It produces the reversing of the card-holder $c$ and pushes the card to be delivered out off the pile. The action of the card-slide is in one of the known ways made dependent on the previous putting in of the required coin. In the drawings it is shown, $e.\ g.$, that the delivery-slide $f$ is held locked in its position of rest by the balance-lever $h$, which, with its arm $h'$, engages the fork $f^3$ of the delivery-slide $f$. When through the slot $i$ the requisite coin $k$ is put into the machine, the latter passes through the coinway $l$ upon the arm $h^2$ of the balance-lever $h$ and frees the locking of the delivery-slide $f$. Now the delivery-slide may be pulled forward by the buyer. As soon as the buyer sets free the delivery-slide the latter is moved back to its primary position by means of the spring $f^2$.

In the position shown in the drawings the card group $a$ is opposite to the take-out aperture $e$, and the delivery-slide $f$, with its projection $f''$, holds from behind the last—for instance, the lowest—card $a$ at its back edge. The last card but one, $b$, rests with its corner $b'$ upon the projection $f''$. If the delivery-slide is now pulled forward on to the position marked with dots, the projection $f''$ shoves the last card $a$ through the aperture between the linings $c'$ and $c^2$ and through the take-out opening $e$ in the case. The card $a$ therewith remains perfectly straight and meets on its way with no resistance whatever except the little friction between its even support and the last but one card $b$. The pressure between the last but one card $b$ and the even support also contributes to securing that the last card $a$ retains its straight shape while being carried out of the machine. During the forward movement of the delivery-slide the projection $f'$ is always covered by the surface of the last but one card $b$, so that it can never during the forward movement catch an edge of the card $b$. Furthermore, any displacement of the last but one card $b$ is prevented by the lining $c'$ and the corresponding part of the lining $c^2$ of the card-holder $c$. The card $a$ is then wholly drawn out by the buyer, and the delivery-slide $f$ is released. The slide $f$ is by its spring $f^2$ pulled back into its primary position and during its backward movement effects the reversion of the card-holder $c$ in such a manner that now the group of cards $b$ gets in front of the taking-out slot $e$.

From the peculiar crosswise piling of the cards result six inverted corners by which it is possible to string together such an entire pile as is made visible in Figs. 3 and 4 in two different forms of execution. Such a pile stringed together may be transported and sent away without any fear of the cards getting displaced. There is no need of taking away the strings before the whole pile has been placed into the machine.

On the same shaft $g$ on which is fixed the card-holder $c$ there is fixed the eccentric cam $m$, which possesses the two indentions $m'$ and $m^2$. The two indentions have such a position that when the group of cards $a$ lies before the give-out opening $e$ the indention $m'$ stands in the middle line of the apparatus, and when the card group $b$ stands before the delivery-opening $e$ the indention $m^2$ is in the middle line of the apparatus.

In the Figs. 5-8 different positions of the reversion device are sketched. Fig. 5 responds to the position of Fig. 2, in which the card group $a$ is before the delivery-opening $e$. The indention $m'$ lies in the middle line of the machine, the indention $m^2$ being on the left side. In the indention $m^2$ engages a pin $f^4$. This pin is fixed to a reversing-lever $f^5$, which is attached to the delivery-slide $f$, turning there around the pivot $f^6$. A spring $f^7$ extends to pull the lever $f^5$ into the central position, so that the pin $f^4$ stands in the middle line of the apparatus. In the position shown in Fig. 5 the turning of lever $f^5$ is prevented, because the pin $f^4$ is being pressed against the eccentric $m$. If the slide $f$ is now pulled forward until it arrives at the position shown in Fig. 6, the pin $f^4$ slides along the outer edge of the eccentric and the lever $f^5$ is moved by its spring into the central position. With the backward movement of the slide the pin $f^4$ strikes against the slanting face of the indention $m'$, travels along the slanting face to the bottom of the indention to the right, and while continuing its backward movement up to the position shown in Fig. 7 turns the eccentric $m$ so much that now the indention $m^2$ lies in the central line and the card group $b$ lies before the take-out opening $e$. If on taking out the next card the slide is once more pulled forward up to the position shown in Fig. 8, the lever $f^5$ takes the position sketched, and consequently on being moved back again becomes capable of again turning back the eccentric $m$ into the position sketched in Fig. 5, so that once more the card group $a$ lies in front of the take-out opening $e$.

In Figs. 9 to 14 another construction of the mechanism for reversing the card-holder is shown, which differs from the one just described by this, that there is not fixed to the delivery-slide one reversing-lever, but there are provided two reversing-levers $f^9$ and $f^{10}$, turning round the pivot $f^8$, and by the action of spring $f^{13}$ tend to move toward the central line of slide $f$, which levers, with their pins $f^{11}$ and $f^{12}$, alternately engage in the indentions $n'$ and $n^2$ of the eccentric $n$. The eccentric $n$ is fixed on the shaft $g$. On the same shaft is fastened the card-holder $c$, so that the latter is forced to follow the turning of eccentric $n$. The eccentric $n$ is sketched separately in Fig. 13. Below the eccentric $n$ there sits loosely on the shaft $g$ an eccentric-disk $o$, with the indentions $o'$ and $o^2$ responding to the indentions $n'$ and $n^2$ and with the circular grooves $o^3$ and $o^4$ connected with the said indentions. The eccentric-disk $o$ is shown separately in Fig. 14. In Figs. 9-12 different positions of this reversing mechanism are sketched. Fig. 9 responds to the position of Fig. 2, in which the card group $a$ lies in front of the delivery-opening $e$. The pin $f^{12}$ lies in the indention $n^2$ of the eccentric $n$ and at the same time in the indention $o^2$ of the eccentric-disk $o$. The pin $f^{11}$ lies in the groove $o^3$. If the delivery-slide $f$ is now pulled out, in order to take away the bottom card $a$ up to the position answering to Fig. 10, the pin $f^{12}$ carries the eccentric-disk $o$ to its central position. (Shown in Fig. 10.) Now the indenture $o'$ lies exactly beneath the indention $n'$, while the indention $o^2$ is covered above by the eccentric $n$. If now the slide $f$ is released again and by its spring is pulled back into the first position, the pin $f^{11}$ simultaneously engages the indentions $n'$ and $o'$ and turns the eccentric $n$ and the eccentric-disk $o$ to the right, while the pin $f^{11}$ slides along in the groove $o^4$ and is prevented by the groove $o^4$ from entering the indention $n^2$, which by the turning comes to meet it. So results the position shown in Fig. 11. When now the delivery-slide for taking off the bottom card $b$ is pulled out to the position answering to Fig. 12, the pin $f^{11}$ carries the eccentric-disk $o$ back into its central position. Now the indention $o^2$ is exactly beneath the indention $n^2$, while the indention $o'$ is decked by the eccentric $n$. On the return of the slide the position shown in Fig. 9 is reestablished.

Fig. 15 shows an arrangement for the aforedescribed apparatus for the purpose of preventing that the card-holder c may be turned before the card once pushed forward has not been entirely taken out of the machine, in order that the card which sticks partly in the card-holder c, partly in the case of the machine or the delivery-opening e, may not be crushed by too early a turning of the former. This arrangement on principle consists in this, that the delivery-slide is held back from returning by the card pushed forward and partly still remaining within the machine and is set free again by the card being entirely pulled out of the apparatus. Such a device may be of different constructions. In Fig. 15 it is shown in the following execution: The delivery-slide, provided with teeth s and notches t, is engaged by a pawl p, acting automatically on the advance and return movement. When the delivery-slide f is pulled forward, the pawl p turns round, as shown in Fig. 16, and locks the delivery-slide from returning too soon. If the slide is pulled still farther out, the pawl, as is shown in Fig. 17, becomes extended, entering the notch t, and permits the delivery-slide to go back. When the pawl is turned to the position shown in Fig. 18, it locks the delivery-slide against being pulled unnecessarily farther out. The locking of the delivery-slide f when the card has not been completely pulled out is obtained by this means, and when the slide is thus locked the pawl p is barred or locked and is unlocked by the card being completely pulled out. When the pawl p is barred, as shown in Fig. 15, the delivery-slide is locked against the back movement. The barring of the pawl p is effected by a pivoted and spring-pressed lever q, which when in the position shown in full lines in Fig. 15 abuts against the pawl p. A nose r on the delivery-slide f is adapted to engage one end of the lever q and prevent it from being swung from beneath the pawl p. On pulling the delivery-slide out the nose r is disengaged from the lever q and the pushed card a or b, as the case may be, engages the said lever in such a manner that the lever is barred or locked as long as the card remains within the machine. This barring of the pawl is removed as soon as the card a or b, respectively, is completely taken out, and consequently the turning-lever q is deprived of its support and by the spring q' is pulled into the dotted position in order to give the pawl p a free play for turning round and for freeing the delivery-slide f for the return movement. Consequently the delivery-slide f may without hindrance execute its movement back, or the card-holder c may turn accordingly. The return movement being completed, the barring-lever q is again placed in position by the nose r. The lever q is jointed or hinged at its barring end, so that the pawl p, by means of its spring force, may pass by it and may straighten itself.

Having now described my invention, what I claim, and desire to secure by Letters Patent, is—

1. An automatic selling-machine for cards and the like, comprising a swinging card-holder having compartments arranged at an angle one to the other and adapted to receive cards piled crosswise one upon the other, a reciprocating member for removing the cards from the compartments, and means for swinging the card-holder from the reciprocating member.

2. In an automatic selling-machine for cards and the like, a swinging card-holder having compartments arranged at an angle one to the other and adapted to receive cards piled crosswise one upon the other, a reciprocating member for removing the cards, an eccentric connected with the holder, and means for operating the eccentric from the reciprocating member.

3. In an automatic selling-machine for cards and the like, a swinging card-holder having compartments arranged at an angle one to the other and adapted to receive cards piled crosswise one upon the other, a spring-pressed slide for removing the cards, an eccentric mounted upon the pivot of the holder and provided with notches, and means carried by the slide and engaging the notches of the eccentric.

4. In an automatic selling-machine for cards and the like, a swinging card-holder having compartments arranged at an angle one to the other and adapted to receive cards piled crosswise one upon the other, a spring-pressed slide for removing the cards, an eccentric on the pivot of the holder and provided with notches, and a pivoted and spring-pressed reversing-lever mounted upon the slide and provided with a pin for engaging the notches of the eccentric.

5. In an automatic selling-machine for cards and the like, a swinging card-holder having compartments at an angle one to the other and adapted to receive cards piled crosswise one upon the other, a slide for removing the cards, means for preventing the card-holder from turning when a card is only partially removed, and means for operating the card-holder from the slide.

6. An automatic selling-machine for cards and the like, comprising a casing having an opening at one end, a card-holder pivoted in the casing and having compartments arranged at an angle one to the other and adapted to receive cards piled crosswise one upon the other, a spring-pressed slide having a projection for engaging a card to move it from the holder out through the opening of the casing, and a reversing mechanism for the holder, operated by the slide.

7. An automatic selling-machine for cards and the like, comprising a casing having an opening through which the cards are removed, a pivoted card-holder adapted to receive cards piled crosswise one upon the other, a spring-pressed slide having a projection for engaging a card to remove it from the holder, an eccentric on the pivot of the holder and provided with spaced notches, a reversing-lever pivoted on the slide and provided with a pin for engaging the notches of the eccentric, and a spring secured to the lever and slide.

In testimony whereof I have hereunto set my hand, in presence of two subscribing witnesses, this 3d day of May, 1904.

WILLY ABEL.

Witnesses:
WOLDEMAR HAUPT,
HENRY HASPER.